(12) United States Patent
Murphy et al.

(10) Patent No.: US 9,954,609 B2
(45) Date of Patent: Apr. 24, 2018

(54) ALARM SYSTEM FOR AN OPTICAL NETWORK

(71) Applicant: Network Integrity Systems, Inc., Hickory, NC (US)

(72) Inventors: Cary R. Murphy, Hickory, NC (US); Daniel Goertzen, Winnipeg (CA); Mark K Bridges, Hickory, NC (US)

(73) Assignee: Network Integrity Systems Inc., Hickory, NC (US)

( * ) Notice: Subject to any disclaimer, the term of this patent is extended or adjusted under 35 U.S.C. 154(b) by 606 days.

(21) Appl. No.: 14/145,121

(22) Filed: Dec. 31, 2013

(65) Prior Publication Data
US 2016/0218800 A1   Jul. 28, 2016

Related U.S. Application Data

(60) Provisional application No. 61/747,898, filed on Dec. 31, 2012, provisional application No. 61/748,645, filed on Jan. 3, 2013.

(51) Int. Cl.
H04B 10/00 (2013.01)
H04B 17/00 (2015.01)
(Continued)

(52) U.S. Cl.
CPC ..... *H04B 10/0795* (2013.01); *H04B 10/0793* (2013.01); *H04B 10/27* (2013.01);
(Continued)

(58) Field of Classification Search
CPC ............ H04B 10/0795; H04B 10/0793; H04B 10/27; H04B 10/07; H04B 10/079;
(Continued)

(56) References Cited

U.S. PATENT DOCUMENTS 3,745,550 A * 7/1973 Anthony ............ G08B 13/1895
                                                   250/221
4,297,684 A * 10/1981 Butter ................. G08B 13/186
                                                   250/227.19

(Continued)

*Primary Examiner* — M. R. Sedighian
*Assistant Examiner* — Abbas H Alagheband
(74) *Attorney, Agent, or Firm* — Adrian D Battison; Ade & Company Inc.; Michael R. Williams

(57) ABSTRACT

A method is provided for detecting intrusion into optical fibers of a Passive Optical Network (PON) of the type which includes a multiplexing system at the head end for separating a data signal output at the head end to the plurality of fibers for supply to user end terminals and a data transmission system at each of the user end terminals for entering onto the fiber data as an optical signal. The method includes providing a monitor system having a transmitter at the head end and a monitor signal analysis system for analyzing changes in the optical monitor signal after transmission along the fiber for detecting an intrusion event. A monitor signal analysis system is provided at one or more user end terminals for detection and conversion of data from the analysis into a digital signal which is then transmitted from the user end terminals back to the head end using the data transmission system through the PON system or separately from the PON system.

12 Claims, 1 Drawing Sheet

(51) Int. Cl.
*H04B 10/079* (2013.01)
*H04J 14/02* (2006.01)
*H04L 12/24* (2006.01)
*H04B 10/27* (2013.01)
*H04L 12/26* (2006.01)
*G02B 6/00* (2006.01)
*H04B 10/071* (2013.01)

(52) U.S. Cl.
CPC .............. *H04J 14/02* (2013.01); *H04L 41/06* (2013.01); *H04L 43/0811* (2013.01); *H04L 43/10* (2013.01); *G02B 6/00* (2013.01); *H04B 10/00* (2013.01); *H04B 10/071* (2013.01)

(58) Field of Classification Search
CPC ......... H04B 10/00; H04B 10/08; H04J 14/02; H04J 14/00; H04L 41/06; G02B 6/00; G01N 21/00; G08B 13/02; G08B 13/186; G08B 13/00
USPC ....... 398/25, 72, 40, 28, 16, 13; 385/13, 12; 340/566, 541; 356/73.1
See application file for complete search history.

(56) References Cited

U.S. PATENT DOCUMENTS

| | | | | |
|---|---|---|---|---|
| 4,636,029 A * | 1/1987 | Johansson | H04B 10/85 | 340/555 |
| 4,844,573 A * | 7/1989 | Gillham | G02B 6/4246 | 156/158 |
| 4,863,270 A * | 9/1989 | Spillman, Jr. | G01D 5/35351 | 250/227.19 |
| 4,931,771 A * | 6/1990 | Kahn | G02B 6/4469 | 250/227.14 |
| 4,965,856 A * | 10/1990 | Swanic | H04B 10/00 | 340/555 |
| 5,093,568 A * | 3/1992 | Maycock | G01M 11/3136 | 250/227.14 |
| 5,109,443 A * | 4/1992 | Hill | H04B 10/85 | 250/227.14 |
| 5,311,592 A * | 5/1994 | Udd | H04B 10/85 | 380/256 |
| 5,710,648 A * | 1/1998 | Frigo | H04B 10/2587 | 340/531 |
| 6,148,123 A * | 11/2000 | Eslambolchi | H04B 10/07 | 250/227.15 |
| 6,630,992 B1 * | 10/2003 | Vobian | H04B 10/071 | 356/73.1 |
| 7,092,586 B2 * | 8/2006 | Vokey | G02B 6/262 | 385/12 |
| 7,120,324 B2 * | 10/2006 | Murphy | G02B 6/262 | 385/12 |
| 7,142,737 B1 * | 11/2006 | Murphy | G01M 11/3181 | 340/541 |
| 7,206,469 B2 * | 4/2007 | Murphy | H04B 10/071 | 340/541 |
| 7,280,189 B2 * | 10/2007 | Weller | H04B 10/0771 | 356/73.1 |
| 7,333,681 B2 * | 2/2008 | Murphy | G02B 6/421 | 385/12 |
| 7,376,293 B2 * | 5/2008 | Murphy | H04B 10/077 | 385/12 |
| 7,403,674 B2 * | 7/2008 | Murphy | G02B 6/2852 | 385/12 |
| 7,403,675 B2 * | 7/2008 | Murphy | G08B 13/186 | 385/12 |
| 7,630,641 B1 * | 12/2009 | Uhlhorn | H04B 10/071 | 398/28 |
| 7,634,387 B2 * | 12/2009 | Murphy | H04B 10/00 | 702/183 |
| 7,693,359 B2 * | 4/2010 | Murphy | H04B 10/071 | 340/552 |
| 7,706,641 B2 * | 4/2010 | Murphy | H04B 10/85 | 385/12 |
| 7,844,178 B1 * | 11/2010 | Eslambolchi | G08B 13/186 | 385/12 |
| 7,885,543 B2 * | 2/2011 | Chen | H04N 7/22 | 370/352 |
| 8,094,977 B2 * | 1/2012 | Murphy | H04B 10/071 | 356/364 |
| 8,218,966 B2 * | 7/2012 | Gutin | H04B 10/2503 | 398/39 |
| 8,233,755 B2 * | 7/2012 | Murphy | H04B 10/071 | 356/364 |
| 8,260,134 B2 * | 9/2012 | Sarashina | H04Q 11/0067 | 398/67 |
| 8,705,020 B2 * | 4/2014 | Zhuang | G01D 5/35361 | 356/73.1 |
| 8,886,043 B2 * | 11/2014 | Chen | H04J 14/005 | 370/352 |
| 8,913,887 B2 * | 12/2014 | Hirth | H04B 10/0771 | 356/73.1 |
| 8,913,888 B2 * | 12/2014 | Effenberger | H04B 10/071 | 398/21 |
| 2002/0097461 A1 | 7/2002 | Patel | | |
| 2002/0131106 A1 * | 9/2002 | Snawerdt | H04B 10/505 | 398/91 |
| 2003/0215236 A1 * | 11/2003 | Manifold | H04J 14/025 | 398/79 |
| 2004/0037556 A1 * | 2/2004 | Matz | H04B 10/032 | 398/40 |
| 2006/0002649 A1 * | 1/2006 | Murphy | G02B 6/262 | 385/12 |
| 2006/0002650 A1 * | 1/2006 | Vokey | G02B 6/262 | 385/12 |
| 2006/0007426 A1 * | 1/2006 | Weller | H04B 10/0771 | 356/73.1 |
| 2006/0029390 A1 * | 2/2006 | Schmuck | H04B 10/071 | 398/33 |
| 2006/0067693 A1 * | 3/2006 | Hakomori | H04B 10/85 | 398/79 |
| 2006/0092404 A1 * | 5/2006 | Weller | H04B 10/0771 | 356/73.1 |
| 2006/0110161 A1 * | 5/2006 | Cho | H04B 10/071 | 398/72 |
| 2006/0147211 A1 * | 7/2006 | Kim | H04J 14/02 | 398/72 |
| 2006/0153491 A1 * | 7/2006 | Murphy | H04B 10/071 | 385/13 |
| 2006/0153520 A1 * | 7/2006 | Murphy | H04B 10/071 | 385/147 |
| 2006/0164628 A1 * | 7/2006 | Kuo | H04B 10/071 | 356/73.1 |
| 2006/0291795 A1 * | 12/2006 | Murphy | G01M 11/3181 | 385/147 |
| 2007/0029991 A1 * | 2/2007 | Murphy | G01H 9/004 | 324/96 |
| 2007/0077064 A1 * | 4/2007 | Murphy | H04B 10/00 | 398/13 |
| 2007/0086693 A1 * | 4/2007 | Murphy | G02B 6/2852 | 385/12 |
| 2007/0086694 A1 * | 4/2007 | Murphy | H04B 10/85 | 385/13 |
| 2007/0092176 A1 * | 4/2007 | Murphy | H04B 10/077 | 385/13 |
| 2007/0110247 A1 * | 5/2007 | Murphy | H04L 9/0858 | 380/278 |
| 2007/0113268 A1 * | 5/2007 | Murphy | H04B 10/70 | 726/2 |
| 2007/0116400 A1 * | 5/2007 | Murphy | G08B 13/186 | 385/12 |
| 2007/0121556 A1 * | 5/2007 | Cho | H04J 14/005 | 370/335 |
| 2007/0127923 A1 * | 6/2007 | Dalton | H04B 10/27 | 398/71 |
| 2007/0133922 A1 * | 6/2007 | Murphy | G02B 6/421 | 385/12 |

(56) References Cited

U.S. PATENT DOCUMENTS

| | | | |
|---|---|---|---|
| 2007/0143645 A1* | 6/2007 | Haran | H04B 10/077 714/704 |
| 2008/0008417 A1* | 1/2008 | Gilbert | H04B 10/272 385/24 |
| 2008/0031151 A1* | 2/2008 | Williams | H04L 12/2697 370/252 |
| 2009/0148159 A1* | 6/2009 | Schofield | H04B 10/85 398/40 |
| 2009/0232494 A1* | 9/2009 | Hehmann | H04B 10/079 398/25 |
| 2009/0263123 A1* | 10/2009 | Zhu | H04B 10/071 398/16 |
| 2010/0014072 A1 | 1/2010 | Bosselmann | |
| 2010/0054657 A1* | 3/2010 | Murphy | H04B 10/071 385/12 |
| 2010/0097234 A1* | 4/2010 | Eslambolchi | G08B 13/186 340/653 |
| 2010/0158460 A1* | 6/2010 | Yoon | G02B 6/0283 385/124 |
| 2010/0196015 A1* | 8/2010 | Gutin | H04B 10/2503 398/141 |
| 2011/0013904 A1* | 1/2011 | Khermosh | G01M 11/3118 398/16 |
| 2011/0135307 A1* | 6/2011 | Conner | H04J 14/0282 398/72 |
| 2011/0241881 A1* | 10/2011 | Badinelli | G02B 6/4446 340/541 |
| 2012/0039598 A1* | 2/2012 | Dahlfort | H04B 10/071 398/13 |
| 2012/0060615 A1* | 3/2012 | Farhadiroushan | G01D 5/35303 73/655 |
| 2012/0076453 A1* | 3/2012 | Murphy | H04B 10/071 385/13 |
| 2012/0176606 A1* | 7/2012 | Zadorozhny | G01D 5/35361 356/73.1 |
| 2013/0051802 A1* | 2/2013 | Chen | H04J 14/005 398/67 |
| 2013/0188176 A1* | 7/2013 | Lovely | G01D 5/353 356/73.1 |
| 2014/0050471 A1* | 2/2014 | Bernasconi | H04B 10/032 398/2 |
| 2014/0091929 A1* | 4/2014 | Murphy | G08B 13/186 340/541 |
| 2014/0140689 A1 | 5/2014 | Dahlfort | |

* cited by examiner

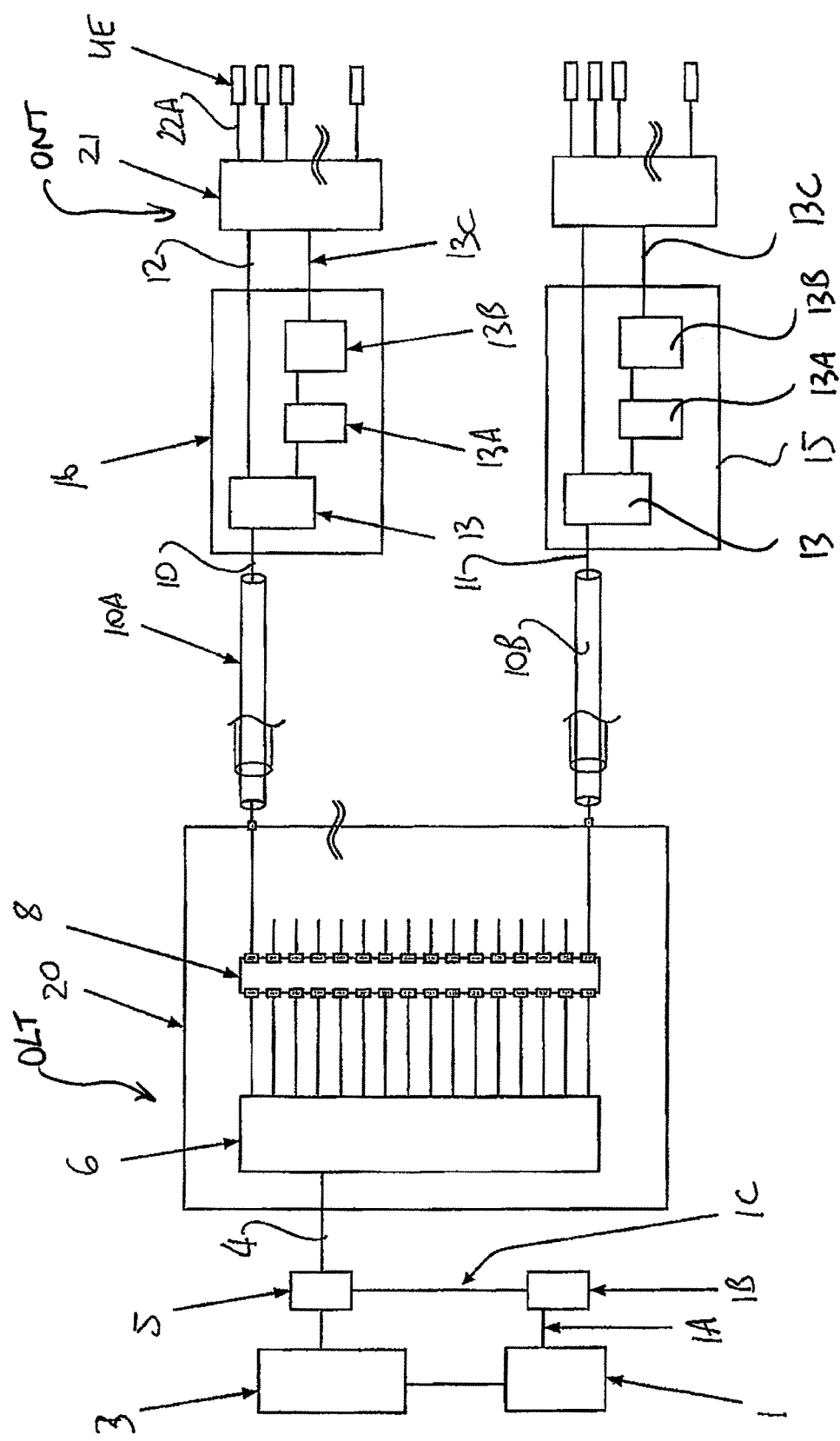

ALARM SYSTEM FOR AN OPTICAL NETWORK

BACKGROUND OF THE INVENTION

This application relates to an alarm system manufactured by the present assignees under the trade marks Interceptor and Vanguard, details of which are available from a number of prior issued patents by the Assignees including U.S. Pat. No. 7,333,681 (Murphy) issued Feb. 19, 2008 which describes a system for securing multimode fibers and U.S. Pat. No. 7,142,737 (Murphy) issued Nov. 28 2006 which describes a system for securing single mode fibers. The disclosures of each of the above patents are incorporated herein by reference.

In each of these systems, an optical signal is transmitted along a fiber and the signal received at a receiver which extracts a received signal which can have different characteristics relative to the transmitted signal due to movement of the fiber. The received signal is thus analyzed in a light signal analysis system to extract a signal indicative of any changes in characteristics of the light signal. This signal is then itself analyzed to determine whether the characteristics have changed sufficiently to indicate that a movement of the fiber indicative of an attempt to intrude into the fiber has occurred. The system further includes a control and alarm system which controls the system and an alarm in the event that an intrusion has been found.

The arrangement and location of the components can vary widely with the receiver located at the same end as the transmitter or at an opposed end. The alarm and control system can also be located at different positions in the system. Communication of data between the components can be carried out in different ways.

Many different constructions and techniques for this system are well known to persons skilled in the art and can be determined from one or more of the patents of the Assignees.

According to US Government regulations, a network carrying unencrypted classified data must be protected by a Protected Distribution System (PDS), One form of PDS is the Alarmed Carrier, which is a system by which a conveyance or carrier is alarmed by a device for detecting intrusions and attempted intrusions.

An example of an arrangement of this type is shown in U.S. Pat. No. 7,706,641 issued Apr. 27, 2010 by the present Applicants which describes in detail the monitoring system used in the present application, the disclosure of which is incorporated herein by reference. This patent describes that some or all of the optical fibers of a single-mode or multi-mode cable are monitored for intrusion by transmitting through the fibers a signal which can be analyzed for changes in its characteristics which are indicative of movement as a prelude to an intrusion event.

Data can be stolen from an optical fiber by removing the jacket and installing a tap device on the fiber or by other methods. Optical fiber intrusion detection systems of the type described above detect when a fiber cable is being subjected to vibration, motion, or handling that would be typical of an intrusion attempt. The system reports the intrusion attempt to the cable owner so that the cable can be inspected and the threat removed.

The fiber intrusion detection system works by transmitting a monitoring signal through a fiber loop. Disturbances on the fiber cause the monitoring signal to be modulated. At the end of the loop, the modulated signal is received, digitized and processed, and alarms are raised when an intrusion is detected.

Historically, alarmed carriers required two fibers for monitoring-classically one carrying the laser signal away from the monitoring device, and one carrying the alarm signal back, these joined at the far end (known as "looping back").

A legacy optical network contained two optical fibers for data. Recent advances in technology have seen the introduction of the Passive Optical Network (PON). The PON is a system which delivers bidirectional communication over a single fiber by use of separation of send and receive by utilizing separate wavelengths.

A passive optical network (PON) is a point-to-multipoint, fiber to the premises network architecture in which unpowered optical splitters are used to enable a single optical fiber to serve multiple premises, typically in the range 16-128. A PON consists of a central device, generically referred to as an optical line terminal (OLT) in this document at the service provider's central office and a number of end terminals generically referred to as optical network terminals (ONTs) in this document, or known as Optical Network Units (ONUs) near the end users. A PON reduces the amount of fiber and central office equipment required compared with point-to-point architectures.

SUMMARY OF THE INVENTION

It is one object of the invention to provide an alarm system of the above type when used with a PON system.

According to one aspect of the invention there is provided a method for detecting intrusion into at least one optical fiber of an optical fiber cable of an Optical Network where the network comprises:

a plurality of fibers each having a first end and a second end;

the second end of at least some of the fibers being connected to respective ones of a plurality of user end terminals;

a multiplexing system for separating a data signal output to the plurality of fibers for supply to the user end terminals;

a data transmission system at each of the user end terminals for transmitting data as an optical signal;

the method comprising:

providing a monitor system having a transmitter for a monitor signal to be applied onto at least one of the plurality of fibers, the monitor system having a monitor signal analysis system for analyzing changes in the optical monitor signal after transmission along the fiber or fibers for detecting an intrusion event;

providing at at least one of said end user terminals a monitor signal receiver system for detection and conversion of data from the analysis into a digital signal;

and transmitting the digital signal from said at least one of the user end terminals back to the monitor system using the data transmission system.

Thus this new remote sensor system can be used on a fiber carrying data multiplexed with the data or on a dark fiber, or fiber that is not yet active with data.

The arrangement herein is particularly applicable and designed for use with a PON architecture. This technique can however also be useful for standard Ethernet, single fiber video transmission, non-network, or as yet undiscovered architectures.

The fibers can be single mode or multimode fiber.

In one arrangement not just one but a plurality of and in some cases all of the ONTs of the end users include a receiver for detection and conversion to a digital signal of the monitor signal after transmission along a fiber to the ONT of the end user. In this case the receivers are generally arranged to transmit the digital signals as data to the signal processing system at a location remote from the receivers.

The terms OLT and ONT as used herein are intended to refer not to specific devices as manufactured by a specific company but generally to devices which provide the head end capability and remote end user terminals of a PON system, respectively.

This remote location can be at the OLT or the signal processing system can be located remotely from the OLT and the ONTs so that the signal control and processing system can manage multiple remote transmitters and remote receivers via a data network.

In some cases the receivers can communicate with the signal processing system using the PON data network. However, alternatively, the receivers can communicate with the signal processing system using a data network separate from the PON.

To reduce cost in some cases multiple fiber runs are secured by daisy chaining (as shown in the above patent) the runs onto a single monitoring port at one of the ONTs thus reducing the number of ports required to monitor a given number of fiber runs.

In PON deployments there will be many remote sensors for each monitoring signal transmitter. Some monitoring methods split the signal at the receiver into two or more signals that are digitized separately. To reduce total system complexity and cost, the split signals can instead be generated at the monitoring signal transmitter and then time division multiplexed (TDM) onto the fiber. The multiplexed signal can then be received by a single photo-detector/ADC at the remote sensor. Demultiplexing may take place at the remote sensor or at the control and processing system.

That is, there are multiple end point (ONT) monitoring receivers feeding back to a single photo-detector at the head end, and that these signals can be multiplexed in time so that the head end monitor receiver is not jammed with multiple concurrent signals.

The signal output can be an out of band monitor wavelength which is multiplexed or coupled into the data fiber, a portion of the data signal, such as by use of a tap coupler, an unused wavelength in WDM implementation, an injected special monitor wavelength within WDM window or a special monitor wavelength outside of data wavelengths using coupler such as, but not limited to wideband or WDM.

As set forth above, the present arrangement is particularly designed for use with a PON system. PON typically uses 1310, 1490, and 1550 windows. The system can use yet a different wavelength such as 1625 nm for monitoring.

That is the OLT transmits many wavelengths of data carrying so-called "content" (like movies on demand) which are multiplexed onto different wavelengths tightly distributed around 1550 nm. This is called DWDM, or dense wavelength division multiplexing. Separation might be less than a nm, 1550.1, 1550.9, 1551.7, etc. Thus the monitor wavelength is basically an unused wavelength within the 1550 DWDM window.

A portion of the data signal can be extracted and analyzed without WDM. The multiple wavelengths potentially enhance the sensitivity of the detection by allowing multiple states of polarization to be detected simultaneously by virtue of the multiple laser transmitters inherent in the OLT.

Optical fiber intrusion detection systems typically require a complete fiber loop for operation, however there are situations where the outgoing path is available but the return path is not. This invention solves the return path problem by receiving the monitoring signal at the remote end and returning it via a data communication network. This invention is particularly effective for securing PONs (Passive Optical Networks).

In this invention, a standard optical fiber security system used for Passive Optical Networks (PON) would utilize a system for monitoring the fiber where all equipment is on the system data transmit end. For high fiber count installations, this has the disadvantage of the inability to distinguish which branch is in alarm. This invention moves a portion to the detection to the end user location, feeds the detection signal back over the existing network, allowing a lower cost system that can distinguish which fiber is in alarm.

A fiber intrusion detection system may operate on a fiber carrying live data through the use of Wave Division Multiplexors (WDMs). The data and monitoring lasers might operate at different wavelengths, in which case the WDMs will separate the beams based on wavelength.

This configuration of Optical Fiber Intrusion Detection System monitors multiple fiber runs (as commonly found in PON) by combining the runs onto a single monitoring port. This reduces the number of ports required to monitor a given number of fiber runs.

Instead of forming a full optical loop, the receiver is placed at the far end of the monitoring fiber. The signal is digitized and returned to the control/processing unit via a data network (for example, ethernet), preferably over the protected PON itself by transmitting the monitor data by the ONT to the OLT for transmission to the monitor controller system.

To allow monitoring systems to scale to large networks, it may be beneficial to separate the monitoring signal transmitter from the control and processing system. The control and processing system can manage multiple remote transmitters and remote receivers via a data network.

A PON can be secured by deploying a Remote Sensor at each ONT, and a transmitter (remote or integrated) at the OLT. WDMs might be used to multiplex the monitoring signal onto the PON, and the PON data network serves as the Remote Receiver return path. Alternatively, the OLT transmitter can supply the monitor wavelength either separately or by virtue of the data transmission.

The advantages to this system are that no equipment needs to be added at the splitter, and that it can be rapidly retrofitted to an existing PON with no need for additional fiber deployment.

In PON deployments there will be many remote sensors for each monitoring signal transmitter. Some monitoring methods split the signal at the receiver into two or more signals that are digitized separately. To reduce total system complexity and cost, the split signals can instead be generated at the monitoring signal transmitter and then time division multiplexed (TDM) onto the fiber. The multiplexed signal can then be received by a single photodetector/ADC at the remote sensor. Demultiplexing may take place at the remote sensor or at the control and processing system.

Preferably the monitor system acts by providing at least one sensor arrangement for receiving a light signal transmitted through the fibers, detecting a series of received light signals which have been transmitted along the fibers to be monitored; comparing at least some of the received light signals relative to data obtained from previously received ones of the received light signals to detect changes in the received light signals relative to the previously received light signals; and analyzing the changes to determine any changes which are indicative of manipulation of the optical fiber causing movement of a portion thereof along the length thereof.

Preferably the monitor system acts to generate an alarm in response to the detection of any such changes which are indicative of manipulation of the optical fiber causing movement of a portion thereof along the length thereof.

Preferably the PON signal and the monitor signal are located in an armored fiber or cable so as to meet federal approval for armored cable PDS.

If external laser is used, preferably the PON signal and protection signal are multiplexed so SPON exists on a single fiber.

Preferably the multiplexing is performed by wavelength, utilizing an out of band laser for monitoring, coupled in through a coupler such as WDM.

Preferably an unused wavelength of the PON transmitter is used as the monitor source.

BRIEF DESCRIPTION OF THE DRAWINGS

One embodiment of the invention will now be described in conjunction with the accompanying drawings in which:

FIG. 1 is a schematic illustration of the system according to the present invention.

DETAILED DESCRIPTION

Data signals from a data source 3, such as a PON Optical Line Terminal (OLT) are supplied on an optical fiber 4. A monitor controller 1 provides control signals on a line 1A to a laser optical source 1B to generate monitor signals on a fiber 1C.

The data signal on the fiber 4 and the monitor signal on the optical connection 1C are multiplexed onto the single fiber 4 by an optical interface 5.

The system includes a junction box 20 including a 1×N optical splitter 6, which is typically, but not necessarily a 1×16 splitter, which acts to connect the monitor and data signals to multiple outputs. Each output from the splitter 6 is supplied respectively to a patch panel 8.

The output from the distribution box 20 is supplied to cables 10A, 10B for transmission to user end terminals at remote locations. Thus fiber 10 of the cable carries combined monitor and data signals to a remote location such as a user drop box or monitoring interface 16. Thus fiber 11 carries combined monitor and data signals to remote location such as a user drop box or interface 15. The cables 10 and 11 are shown as examples of a series of such cables from the separate output ports.

At each user's drop box 15, 16 is a connector 12 for delivering data to an optical network terminals (ONT) 21 which supplies a plurality of lines 22A to individual user equipment UE. The user drop boxes 15 and 16 are conventional and allow end user to access secure network with equipment such as a computer via ONT 21.

In some more complex systems there can be provided a secondary distribution box similar to the distribution box 20, also known as a "Zone Box" for further distributing the data and/or monitoring to further locations 15, 16 etc The PON Optical Line Terminal (OLT) 3 is sending out data for the end users over fiber 4. The signals are split by splitter 6 for feeding the ultimate end users.

Additional implementations can include substituting additional layers of distribution by additional distribution boxes 20 for many more end users 15, 16. For example, patch panel 8 might feed cables to individual floors of a building. On those floors are the additional distribution boxes such as distribution boxes 20 for supplying the users in offices.

The PON transmitter 3 is connected to the lead-in fiber 4, which is preferably insensitive, leading to the distribution box 20. The PON signal and the monitor signal on the cables 10, 11 are located in an armored fiber or cable 10A so as to meet federal approval for armored cable PDS. Alternatively, the PON and monitoring fibers can be located in other approved hardened carrier conveyances such as EMT or conduit.

As described above, the PON signal and the protection signal can be the same signal, or can be separate signals that are multiplexed using WDM so that Secure PON (SPON) exists on a single fiber.

In one implementation as described above, the multiplexing is performed by wavelength and can use as the source at the alarm unit 1 an out of band laser unused wavelength of the PON transmitter for monitoring, coupled in through the WDM.

In another implementation as described above a portion of the PON data signal is used as the monitor source and analyzed for intrusion, thereby precluding the need for controller 1A, optical source 1B or interface 5.

As shown at 13, each of the ONTs of the end users includes a receiver or optical interface for the transmitted monitoring signal which acts to extract the monitor signal and to transfer it to a signal analysis and detection device 13A which acts to detect changes in the monitor signal after transmission along said respective fiber, which changes are indicative of vibration, motion, or handling of said respective fiber indicative of an attempt to intrude into said respective fiber. The device 13A can include an A/D converter for conversion of the signal to a digital signal. The receiver is arranged to transfer the digital signal through an interface 13B to the ONT along a data connector 13C for encoding as a digital data signal for transmission back along the same fiber 12. Thus the system 13A acts as an input to the ONT for data to be multiplexed with data from the user terminals and transmitted back along the fiber as data.

The optical interface comprises an inline device such as an optical coupler or WDM. Alternatively the interface can comprise or an external device such as a clip on tap-coupler for extracting a portion of the monitor or data signal for intrusion analysis.

Multiple fiber runs can be secured by daisy chaining the runs onto a single monitoring port at one of the ONTs thus reducing the number of ports required to monitor a given number of fiber runs so that only OLT or port 15D reports to the system 1.

The signal processing system in FIG. 1 is at the OLT. A single computer or other analysis system 1 may be used to monitor multiple monitor interfaces 16.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for detecting intrusion into an optical network wherein the optical network comprises:

a plurality of fibers each having a first end at a head end of the network and a second user end;

the second user end of at least two of said plurality of fibers being connected to respective ones of a plurality of user end terminals;

a splitter/combiner system for separating a data signal output at said head end to said plurality of fibers for supply data signals to said plurality of user end terminals;

a data transmission system at each of said plurality of user end terminals for transmitting data as an optical signal along a respective one of said plurality of the fibers to said head end;

the method comprising:

transmitting a monitor signal from the head end on at least two of said plurality of fibers;

at said second user end of each respective fiber on which the monitoring signal is transmitted, detecting changes in the monitor signal after transmission along said respective one of said fibers, which changes are indicative of vibration, motion, or handling of said respective one of said fibers indicative of an attempt to intrude into said respective one of said fibers;

at said second user end of said respective one of said fibers, generating from said detected changes, change data signals containing data related to the changes;

encoding the change data signals to form encoded change data signals which are transmitted from said second user end of each respective one of said fibers back to the head end;

and at the head end, carrying out an analysis of the encoded change data signals from all of said respective fibers to detect said vibration, motion, or handling of each of said respective fibers indicative of an attempt to intrude into said respective fiber;

whereby said analysis can distinguish on which one of said fibers the changes indicative of an attempt to intrude have occurred.

2. The method according to claim 1 wherein the encoded change data signals are transmitted to the head end using the data transmission system.

3. The method according to claim 1 wherein the supply data signals and the monitor signals are time division split as TDM signals onto said fibers so that said TDM signals are received by a single photodetector/ADC at the second end of said fibers.

4. The method according to claim 3 wherein said TDM signals are combined at the second end of said fibers.

5. The method according to claim 3 wherein said TDM signals are combined at the head end.

6. The method according to claim 1 wherein the monitor signal is an out of band monitor wavelength of the supply data signals.

7. The method according to claim 1 wherein the monitor signal is a portion of the supply data signal.

8. The method according to claim 1 wherein the monitor signal is an unused wavelength of the supply data signals and is split with the supply data signals using WDM.

9. The method according to claim 1 wherein there is provided an insensitive lead-in fiber leading to the splitter/combiner system.

10. The method according to claim 1 wherein the fibers are located in an approved hardened conveyance so as to meet federal approval for alarmed carrier PDS.

11. The method according to claim 1 wherein connection between the head end and the user end terminals is provided solely by fiber.

12. The method according to claim 1 wherein connection between the head end and the user end terminals is provided by hybrid fiber/electrical.

* * * * *